United States Patent [19]
Shelhamer

[11] Patent Number: 5,772,872
[45] Date of Patent: Jun. 30, 1998

[54] PORTABLE SWIMMING POOL WATER TREATMENT SYSTEM

[76] Inventor: Donald E. Shelhamer, P.O. Box 160, Roseland, Fla. 32957

[21] Appl. No.: 824,828

[22] Filed: Mar. 26, 1997

[51] Int. Cl.⁶ .................................. E04H 4/00; C02F 1/66
[52] U.S. Cl. ...................... 210/169; 210/199; 210/206; 210/288
[58] Field of Search .................. 210/169, 198.1, 210/199, 205, 206, 257.1, 259, 266, 288, 416.2; 239/315, 316; 422/261, 276, 277

[56] References Cited

U.S. PATENT DOCUMENTS

| | | | |
|---|---|---|---|
| 1,806,025 | 5/1931 | Seaman | 239/315 |
| 3,083,916 | 4/1963 | Neel | 239/315 |
| 4,933,080 | 6/1990 | Rundzaitis et al. | 210/420 |
| 5,032,292 | 7/1991 | Conrad | 210/169 |
| 5,208,923 | 5/1993 | Stiver | 210/169 |
| 5,225,074 | 7/1993 | Moini | 210/169 |
| 5,407,567 | 4/1995 | Newhard | 210/169 |
| 5,427,748 | 6/1995 | Wiedrich et al. | 210/169 |
| 5,582,718 | 12/1996 | Sobczak | 210/198.1 |
| 5,662,796 | 9/1997 | Kerecz | 210/169 |

Primary Examiner—Peter A. Hruskoci
Assistant Examiner—Theodore M. Green
Attorney, Agent, or Firm—McHale & Slavin

[57] ABSTRACT a portable water treatment system for bulk filling of a swimming pool with treated water. The system discloses a pH conditioning tank and a water conditioning tank allowing for the filling of a pool, without the need for pumps, electricity, or controls on the incoming water source. The system includes the use of soaker devices that allow treatment of the water through the addition of a predetermined amount of chemical as it is exposed to the incoming water. The system allows for treated water to be placed into the pool so as to prohibit early degradation of the walls or materials of the swimming pool surfaces.

10 Claims, 1 Drawing Sheet

PORTABLE SWIMMING POOL WATER TREATMENT SYSTEM

FIELD OF THE INVENTION

This invention is related to the treatment of swimming pool water and in particular to a water treatment system for use in the initial filling of a swimming pool.

BACKGROUND OF THE INVENTION

The bulk filling of a swimming pool can be problematic for untreated water placed into a swimming pool can damage the finished surface. Even if the water is immediately stabilized upon filling of the pool, the damage could be costly to repair and require the draining and refilling of the pool.

If a pool is newly installed or recently repaired, the pool requires an initial bulk filling of water. This water is not run through the typical swimming pool recirculation system for such a system is designed only to treat recirculated water. In addition, a recirculation system requires certain flow rates in order to be effective, thus if the recirculation system is sized to filter a set volume of water, the system will not operate correctly for a bulk fill. For this reason, swimming pool treatment systems must be bypassed during the initial bulk filling. However, waiting until the pool is filled before treating, the water may cause damage to the pool surface such as staining of the surfaces or chemical leaching.

For instance, acidic water having a pH less than 7 may cause leaching of coating products having lead pigment. In this manner, the lead could immediately begin to dissolve causing stains on a newly finished surface. Similarly, should the water be caustic, pigmentation discolorization may also occur. For this reason, a filled pool is typically treated once the water filling process is complete. However, immediate treatment may not be possible if a qualified individual is not available, or the treatment may be adverse if the water is not properly mixed. In this situation, a delay in filling the pool may be necessary until trained personnel are available.

Some pools must be filled immediately to prevent them from being expelled from the ground due to a high water ground table. Florida presents such a problem wherein a high water table and high volume of rain can easily lift a pool out of the ground. For this reason, it is important to immediately fill the pool once the installation or repair to the pool has been completed. This necessitates the obtaining of such personnel, or risk filling the pool with non-professional personnel.

Even if a qualified individual is available, treating of the water once the pool is filled may be too late. The filling process may cause wall discoloration during the actual filling process, wherein the water treatment may "set" the stain. Various attempts to rectify this situation have been attempted including the use of processes such as reverse osmosis for lowering the dissolved solids. However, reverse osmosis fails to neutralize the pH, is cost prohibitive to operate on a large scale, and requires electricity for operation. Deionization allows for the neutralization of water through a cation/anion exchange, but the total reduction of cations and anions can leave the water in an aggressive state resulting in an additional problem regarding stabilization.

Still other attempts include the use of chemical pumps to insert liquid chemicals into the flow of water. Chemical pumps lack the ability to monitor the flow of water into the swimming pool and require the availability of electricity for the pump as well as for monitoring thereof, to assure the pump is introducing the proper amount of chemical into the water. As each location may have a different water pressure, one location may be able to fill a swimming pool quickly while the next location has a low pressure situation requiring a much longer time making chemical pumps subjective to inserting improper chemical mixtures.

Thus what is lacking in the art is a water treatment system for use treating water placed into a pool during the initial bulk filling, said system operable without electricity, flow rate monitoring, or operator attendance.

SUMMARY OF THE INVENTION

This invention discloses a portable water treatment system for the initial bulk filling of a swimming pool. The system consists of an erosion water treatment tank containing a bed of sodium bicarbonate with a means for coupling to a raw water source. An inlet manifold is placed above the bed of sodium bicarbonate so as to dissolve only a small amount of bicarbonate based upon contact time. The erosion tank includes sufficient freeboard to house a soaker device that allows for placement of additional solid chemicals. The soaker device having a plurality of apertures allowing a wicker-type feed. The sodium bicarbonate operates to prevent erosion of treated surfaces through pH adjustment.

The outlet of the erosion water treatment tank is connected to the inlet of a water conditioning tank. The water conditioning tank operates as a water filter or may be adapted to accept a conditioning media, depending upon the influent water source. For example, if the inlet water is from a surface supply, the water filter may be diatomaceous earth or layers of various grades of sand so as to stop particulate matter from entering the pool. Alternatively, if the inlet supply contains excess tannins, the water filter may include activated carbon having the ability to clarify the water by removal of tannins which typically impart a color to pool water. Similarly, should the incoming water have a high amount of iron or calcium or a cation/anion imbalance, an ion exchange resin may be employed. All such media allows for the conditioning of the water without the use of chemical pumps or electricity.

The water treatment conditioning tank utilizes a manifold valve located at the bottom of the media bed so as to allow for full contact of the media. The freeboard of the water conditioning tank includes an area for placement of a second soaker device for wicking of chemicals into the water. After the water conditioning tank, a liquid chemical such as chlorine may be siphoned into the line if the incoming water lacks a bacterial biostat such as when the media employed includes activated carbon which removes chlorine from the water. The chlorine helps prevent the growth of bacteria or slime in the pool should the initial filling not be followed with subsequent swimming pool treatment.

A feeder canister is then placed in the fluid line following the water conditioning tank wherein a soaker device is placed within the canister allowing placement of sodium bicarbonate, sequestering agents, or the like chemicals for final conditioning of the water before the water is placed into the swimming pool. For instance, if an imbalanced cation/anion ion exchange is used, the soaker device can be used to reestablish the appropriate pH level. The result is conditioned water placed into the pool that will not react with painted surfaces or material treatments to the pool walls so as to allow sufficient time for the conventional pool treatment chemicals to be applied.

Thus, it is an object of the instant invention to disclose a portable water treatment system for conditioning of water for a bulk filling of a swimming pool.

Yet another object of the instant invention is to disclose the use of soaker devices that allow a preset amount of chemical to be introduced into the swimming pool during the filling stage, without the need for electricity.

Still another object of the instant invention is to disclose the use of a pool filling water treatment system that may accommodate any flow rate or pressure available filling of the pool without the need for monitoring of flow rates, pressure, or chemical constituents.

Yet another object of the instant invention is to teach the conditioning of a swimming pool bulk filler so as to prevent the degradation of the walls or materials applied to the swimming pool surface.

Yet still another object of the instant invention is to teach the need for stabilizing swimming pool water during the filling process as opposed to stabilizing of the water once the pool has been filled.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
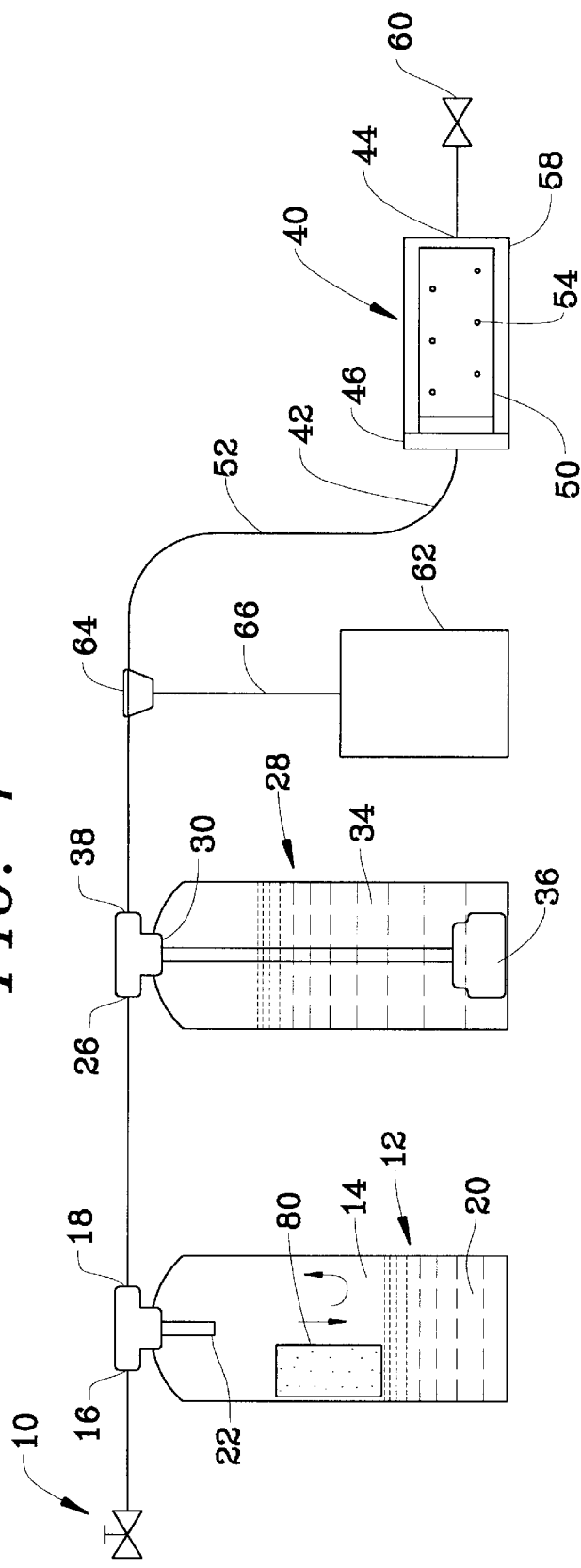
FIG. 1 is a pictorial flow diagram of the water treatment system for swimming pools of the instant invention.

Now referring to FIG. 1, shown is a pictorial flow diagram of the portable water treatment system for use in bulk filling of the swimming pool. It should be noted that one of the unique aspects of this invention is the portability of the water treatment system and the ability to operate on any pressurized water line without the need for external controls, monitoring, or electricity.

The water treatment system couples to a household source by use of a shut-off valve 10 where a first erosion conditioning tank 12 forms a chamber 14 having an inlet 16 and an outlet 18. The chamber 14 houses water dissoluble sodium bicarbonate 20 with a manifold 22 located in the freebore of the chamber used for directing water into the chamber. Contact time with the sodium bicarbonate 20 causes a slow dissolve of the material which is allowed to exit through outlet 18. The influent water erodes the sodium bicarbonate slowly into solution. The solution helps adjust the alkalinity pH as necessary.

The speed of the erosion is controlled by the water flow and related pressure which is directed over the bed of sodium bicarbonate and can be further affected by the size of the tank which would increase the surface area of the bed of sodium bicarbonate. The amount of sodium bicarbonate placed within the tank is dependent upon the size of the swimming pool to be filled and the make-up of the raw water source. Typically the sodium bicarbonate tank is placed as a primary conditioning unit. However, if the water is turbid, it may be necessary to place a media filter or straining element before the erosion tank to inhibit the flow of items that may clog the manifold or place sediment into the material bed.

The outlet 18 of the erosion conditioning tank 12 is coupled to the inlet 26 of a water conditioning tank 28 wherein the water is injected through the coupling 30 along an upper portion of the chamber 32 formed within the tank. Water is passed through a water conditioning bed 34 before entering manifold 36 coupled to outlet 38 so as to provide treated water. The water conditioning tank 28 houses a predetermined amount of material from the group of ion exchange resins, zeolites, activated carbon, and/or filtering media. The type of media or combination thereof is dependent upon the influent water supply.

For instance, ion exchange media, whether a cation or anion, may be used to remove various water constituents such as calcium and/or sulfates so as to inhibit scaling within the water as well as provide for further conditioning of the water based upon the incoming supply. The ion exchange may also consist of a mixed bed of cation/anion resin allowing for equal removal of constituents so as to lower the total dissolved solids that enter the swimming pool. If a high pH is present, it may be reduced by the use of the anion resin which also has the ability of removing heavy metals, similarly a low pH may be raised by the use of an cation resin regulated in the hydroxide state. Additionally, the ion exchange may not be in the form of a deionizer and may operate in a sodium state for exchanging of calcium for sodium. In this mode, the ion exchange operates as a softener which again helps reduce the precipitation of hard water.

Activated carbon may be used if excess color or chlorine is present in the water. Activated carbon has the ability of removing tannins thereby providing clarity to the water. A filtering media may also be placed in addition to the water conditioning media wherein the type of filtering media may consist of a single layer of fine sand or multi-layers providing a multimedia filtration capable of removing particles. For instance, a multimedia filter may prevent any item having a size greater than 50 microns from entering the swimming pool. The outlet 38 of the water conditioning tank 28 is then coupled to a siphon valve 64, which is fluidly connected to chemical feeder container 62 by feeding pipe 66.

Water with low calcium can be adjusted to industry standards by use of the siphon valve 64. Calcium that has been dissolved in the chemical feeder container 62 is drawn through the siphon valve 64 and fed slowly during the course of the pool fill. This advantageously eliminates the need to add calcium after the pool has been filled, eliminating calcium leaching during the pool fill. The siphon valve 64 is connected to the inlet 42 of feeder canister 40. The feeder canister 40 also has an outlet 44.

The feeder canister 40 has an end cap 46 which allows opening into a chamber 48 for insertion of soaker device 50. The soaker device 50 is available for placement of solid granules such as sodium bicarbonate or the like sequestering type agents, wherein a flow-through of the conditioned water from outlet 38 to coupling pipe 52 into the feeder canister 40 provides a slow dissolve of the materials placed within the soaker device. The water contacts the solid chemicals through a plurality of through holes 54 which allows water access in a slow dissolving rate through a predetermined location of through holes. The treated water exits outlet 44 and is available for placement within the pool as depicted by numeral 60. In instances where activated carbon has removed chlorine from the inlet water supply, the chemical feeder container 62 may include a liquid solution of chlorine.

Figure 3:
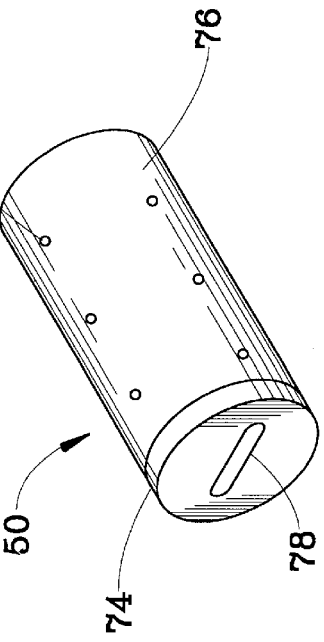
FIG. 3 is perspective view of FIG. 2.
Figure 2:
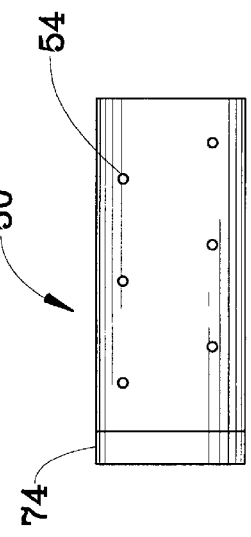
FIG. 2 is a side view of the soaker apparatus.

Now referring to FIGS. 2 and 3, set forth is the soaker device 50 having end cap 54 which engages housing 76 by either a frictional fit or a threaded attachment. The end cap 74 may include a handle 78 which allows for ease of removal from the housing 76 allowing insertion of solid chemical into the chamber formed inside of the soaker device 50. The plurality of through holes 54 allows a slow dissolve of the solid chemical wherein water contacts the hard chemical so as to cause dilution of the hard chemical which provides a leaching type feed of the chemical into the water supply. A controlled slow dissolve is achieved by the size and the amount of holes through the side wall. As noted in FIG. 1, the erosion tank 12 may include a soaker device 80 without the use of a canister if a particular water treatment area requires an additional treatment such as a sequestering agent.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A portable water treatment system for use in bulk filling a swimming pool, said system comprising:
   an erosion conditioning tank forming a chamber for support of sodium bicarbonate, said tank having an inlet and an outlet;
   a first manifold having a proximal end fluidly coupled to said inlet of said erosion conditioning tank and a distal end positioned along an upper portion of said chamber above said sodium bicarbonate;
   a water conditioning tank forming a chamber having an inlet fluidly coupled to said outlet of said erosion conditioning tank, said water conditioning tank containing a conditioning media;
   a second manifold having a proximal end fluidly coupled to said inlet of said water conditioning tank and a distal end positioned beneath said conditioning media;
   a first soaker device positionable inside one of said conditioning tanks which provides a leaching type feed of a chemical into the water;
   a feeder canister having an inlet fluidly coupled to an outlet of said water conditioning tank and an outlet available for use in filling the swimming pool; and
   a second soaker device positionable inside said feeder canister, said soaker devices housing solid chemical which provides a leaching type feed of said solid chemical into the water.

2. The treatment system for a swimming pool according to claim 1, wherein each of said soaker devices is further defined as an elongated housing having a substantially circular sidewall with a first end and a second end forming a chamber therein, said sidewall having a plurality of through holes each having a predetermined diameter.

3. The treatment system for a swimming pool according to claim 2, wherein a first end of each of said soaker devices is releasably secured to said housing allowing access to said chamber.

4. The treatment system for a swimming pool according to claim 1, wherein said conditioning media is selected from the group consisting of ion exchange resin, zeolites, activated carbon, and filtering media.

5. The treatment system for a swimming pool according to claim 1 wherein said soaker device houses a predetermined amount of water dissolvable material selected from the group consisting of sequestering agents and sodium bicarbonate.

6. The treatment system for a swimming pool according to claim 1, including a means for inserting liquid chemical into said outlet of said water conditioning tank, said liquid chemical coupled to a siphon valve allowing a siphoning introduction of said liquid chemical into said treatment system.

7. A portable water treatment system for use in filling a swimming pool, said system comprising:
   an erosion conditioning tank forming a chamber having an inlet and an outlet, said chamber housing water-dissolvable sodium bicarbonate;
   a first manifold having a proximal end fluidly coupled to said inlet of said erosion conditioning tank and a distal end positioned above said sodium bicarbonate;
   an water conditioning tank forming a chamber having an inlet fluidly coupled to said outlet of said erosion conditioning tank;
   a second manifold having a proximal end fluidly coupled to said inlet of said water conditioning tank and a distal end positioned along a lower portion of said chamber;
   at least one soaker housing means defined as an elongated housing having a substantially circular sidewall with a first end and a second end forming a chamber therein, said sidewall having a plurality of through holes each having a predetermined diameter, said soaker housing positionable inside one of said conditioning tanks wherein said soaker housing provides a leaching type feed of a chemical into the water;
   a feeder canister having an inlet fluidly coupled to an outlet of said water conditioning tank and an outlet available for use in filling the swimming pool;
   a soaker feeder housing means positionable inside said feeder canister, said soaker is defined as an elongated housing having a substantially circular sidewall with a first end and a second end forming a chamber therein, said sidewall having a plurality of through holes each having a predetermined diameter, said first end of said soaker is releasably secured to said housing allowing access to said chamber wherein said soaker housing provides a leaching type feed of chemical into the water.

8. The treatment system for a swimming pool according to claim 7, wherein said water conditioning tank houses a predetermined amount of material selected from the group consisting of ion exchange resin, zeolites, activated carbon, and filtering media.

9. The treatment system for a swimming pool according to claim 7, wherein each of said soakers houses a predetermined amount of water dissolvable material selected from the group consisting of sequestering agents, and sodium bicarbonate.

10. The treatment system for a swimming pool according to claim 7, including a means for inserting liquid chemical into said outlet of said water conditioning tank, said liquid chemical coupled to a siphon valve allowing for an introduction of said liquid chemical into treatment system.

* * * * *